(12) United States Patent
Claustre et al.

(10) Patent No.: US 9,833,680 B2
(45) Date of Patent: Dec. 5, 2017

(54) TRAINING DEVICE FOR BOARD SPORTS

(71) Applicants: Fanny Claustre, Port Vila (VU);
Thomas David, Port Vila (VU)

(72) Inventors: Fanny Claustre, Port Vila (VU);
Thomas David, Port Vila (VU)

( * ) Notice: Subject to any disclaimer, the term of this patent is extended or adjusted under 35 U.S.C. 154(b) by 0 days.

(21) Appl. No.: 14/786,760

(22) PCT Filed: Apr. 25, 2014

(86) PCT No.: PCT/FR2014/000090
§ 371 (c)(1),
(2) Date: Oct. 23, 2015

(87) PCT Pub. No.: WO2014/174164
PCT Pub. Date: Oct. 30, 2014

(65) Prior Publication Data
US 2016/0074732 A1 Mar. 17, 2016

(30) Foreign Application Priority Data

Apr. 25, 2013 (WO) .................. PCT/FR2013/000114

(51) Int. Cl.
*A63B 69/00* (2006.01)
*A63B 7/00* (2006.01)
*G09B 19/00* (2006.01)

(52) U.S. Cl.
CPC ............ *A63B 69/0093* (2013.01); *A63B 7/00* (2013.01); *A63B 69/0064* (2013.01); *G09B 19/0038* (2013.01)

(58) Field of Classification Search
CPC ......... A63G 9/00–9/22; A63B 69/0093; A63B 7/00–7/085
See application file for complete search history.

(56) References Cited

U.S. PATENT DOCUMENTS

| 2,539,869 | A | * | 1/1951 | Sicklesteel ............... A63G 9/00 472/4 |
| 5,163,828 | A | | 11/1992 | Coddington, Jr. |
| 5,662,555 | A | | 9/1997 | Cloutier |

(Continued)

FOREIGN PATENT DOCUMENTS

WO 2007/070915 A1 6/2007

OTHER PUBLICATIONS

International Search Report dated Aug. 18, 2014 issued in corresponding application No. PCT/FR2014/000090.

*Primary Examiner* — Loan H Thanh
*Assistant Examiner* — Jennifer M Deichl
(74) *Attorney, Agent, or Firm* — Westerman, Hattori, Daniels & Adrian, LLP (57) ABSTRACT

The invention mainly relates to a training device for a board sport involving the use of a board, that is essentially characterized in that it comprises at least a first (2c) and a second (3c) main support line of the board (6) extending from at least one upper attachment point (4, 5; 51, 75, 77, 81, 83) located above and at a distance of the board (6) as far as a first (13) and a second (14) support element of the board (6) respectively, each extending transversally under the board (6) and each comprising a bearing part (15, 16) on which the lower face (15) of said board (6) is supported.

The device according to the invention is particularly applicable to surf training, the board then being a surf board.

20 Claims, 3 Drawing Sheets

(56) References Cited

U.S. PATENT DOCUMENTS

| | | | |
|---|---|---|---|
| 6,702,686 B1 * | 3/2004 | Brown | A63G 9/12 |
| | | | 472/118 |
| 6,932,710 B1 * | 8/2005 | Hartin | A63B 7/00 |
| | | | 472/118 |
| 7,892,151 B2 | 2/2011 | Colk et al. | |
| 2011/0263344 A1 | 10/2011 | Brown et al. | |

\* cited by examiner

TRAINING DEVICE FOR BOARD SPORTS

The invention relates mainly to a training device for board sports.

The invention is in the domain of board sports involving the use of a board on which the sports person is balanced. For example, board sports to which the invention could be applied non-limitatively include surf, snowboard, wakeboard, kiteboard and Stand Up Paddle boarding.

These board sports require the use of particular gestures on the board, and also balance.

Acquisition of these gestures and balance is particularly difficult due to environmental conditions in addition to the actual gestures that have to be acquired.

In this context, this invention aims at a device for providing balance and muscle training, and also training in the technique of essential gestures for good assimilation and good practice of a board sport involving the use of a board on which the sports person is balanced.

To achieve this, the training device for a board sport involving the use of a board is characterised essentially in that it comprises at least a first and a second main support line of the board extending from at least one upper attachment point located above and at a distance from the board as far as first and second board support elements respectively, each extending transversally under the board and each comprising a bearing part on which the lower face of said board is supported.

The device according to the invention may also include the following optional characteristics taken in isolation or in any technically possible combination:

- each of the first and second main lines comprises a first and a second secondary line, the lower ends of the two secondary lines of the first main line being fixed to the transverse ends of the first support element, and the lower ends of the two secondary lines of the second main line being fixed to the transverse ends of the second support element, and the first and second support elements are located at the front part and the rear part of the board respectively.
- each of a first and a second lower support line extends longitudinally under the board from the transverse end of a support element as far as the transverse end located on the same side of the board as the opposite support element.
- the device comprises a first and a second support element of the board made from an elastic material and extending transversely close to the top face of said board between the transverse ends of the first and second support elements respectively.
- a tightening strap extending transversely between the first and the second secondary lines of a main line concerned being installed free to slide on these said secondary lines.
- the top end of each of the first and second main lines extends from either two distinct attachment points each coinciding with the top end of the first or second secondary line to be considered, or from a single attachment point forming a junction of the upper ends of the first and second secondary lines to be considered, respectively.
- the first and second support lines join at their top part as far as a single upper attachment point, and the device comprises a third main line extending from an upper attachment point located at a longitudinal distance from the upper attachment point of the first and second main support lines, as far as the first and second secondary lines of the closest main line.
- the device comprises a portal frame including at least two upper parallel longitudinal members connected to lower members supported on the ground, and first and second main lines extend from these upper parallel longitudinal members as far as the first and a second support element located at a distance above the ground.
- the attachment point(s) of the first and second main lines are located on one or the other of the upper parallel longitudinal members.
- the device comprises a first removable attachment installed in series on a main line and a second removable attachment installed close to the opposite main line in series on a safety line that extends between the two main lines while supporting a bar line installed free to slide on the safety line and comprising a bar at its lower end facing the board and that will be gripped by the user of the device, the first and second removable connections, when either of them is removed, allowing installation of a third main line that can extend from an upper attachment point as far as the first and second secondary lines of a main line, the remaining top end of which is fixed to one of the remaining removable connections.
- the board is a surf board.

Finally, the invention relates to an application of the device as disclosed above for physical and gestural preparation for a board sport.

Other characteristics and advantages of the invention will become clear after reading the description given below for guidance and that is in no way limitative, with reference to the appended figures among which:

FIG. 3 is an enlarged view of the encircled part III in FIGS. 1 and 4 viewed from the perspective angle illustrated by the arrow showing the encircled part III.

The general principle of the training device according to the invention consists of suspending a sliding board above the ground to benefit from the effects of the suspension to provide balance and muscle training and training in the technique of essential gestures for good assimilation and good practice of a sliding board.

Figure 1:
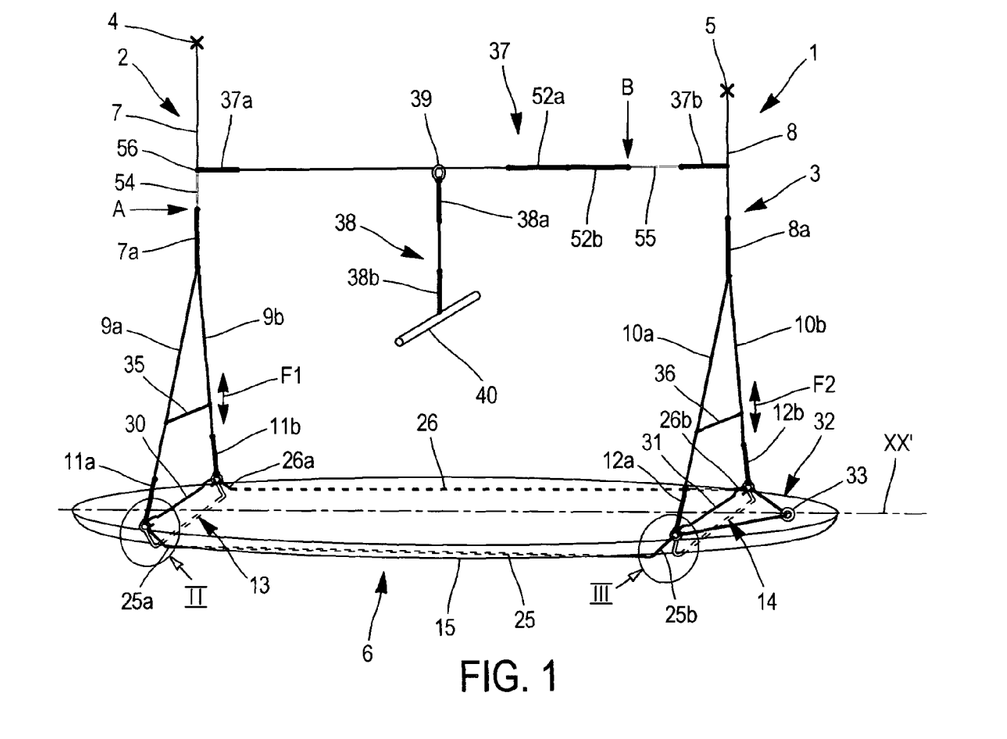
FIG. 1 is a diagrammatic perspective view of a first variant of the device according to the invention.

With reference to FIG. 1 that shows the first embodiment of the invention, the device according to the invention 1 comprises a first main support line 2 and a second main support line 3 extending approximately parallel to each other and vertically from upper attachments point 4, 5 respectively, for example attached to the ceiling or to any system capable of supporting the combined weight of the board and its user, down to the board 6 that extends along a main longitudinal axis XX'.

Each of the first 2 and second 3 main lines is split at mid-height forming a single upper part 7, 8 respectively and a doubled up part composed of first 9a, 10a and second 9b, 10b secondary lines respectively.

Figure 2:
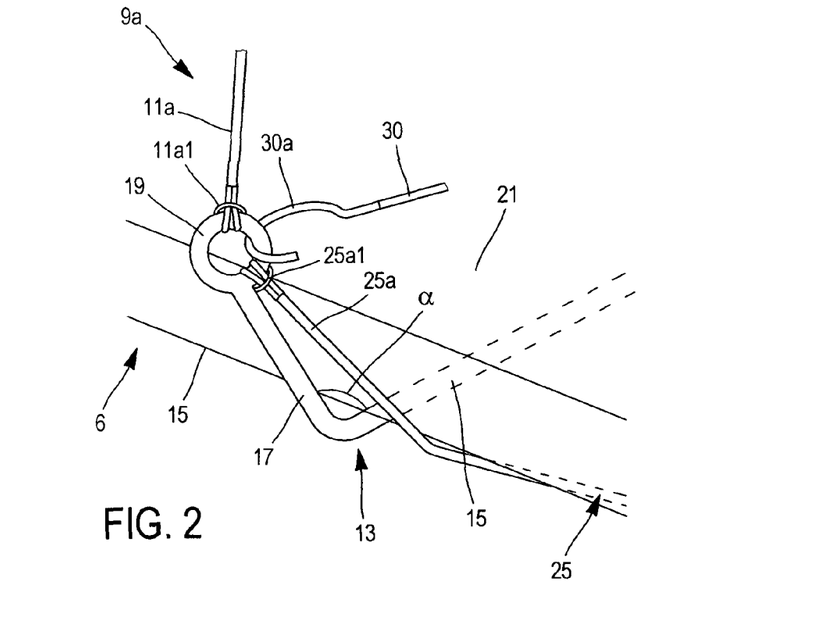
FIG. 2 is an enlarged view of the encircled part II in FIGS. 1 and 4 viewed from the perspective angle illustrated by the arrow showing the encircled part II.

The lower ends of the first 9a, 10a and second 9b, 10b secondary lines each comprise a tightening element 11a, 11b; 12a, 12b that is composed of a cord, the opposite ends of which comprise a knot called a lark's head knot 11a1, 11a2 (FIGS. 2 and 3). As will be seen later, these tightening elements are used particularly for tensioning the device.

With reference to FIGS. 2 and 3, the lower ends of the first 9a, 10a and second 9b, 10b secondary lines are fixed through the lark's head knots 11a1, 12a1 of the attachment elements concerned 11a, 11b; 12a, 12b, to a first 13 and a second 14 support element respectively, on each of which the lower face 15 of the board 6 is supported. The existence of the first 9a, 10a and second 9b, 10b secondary lines fixed to the first 13 and second 14 support elements in particular assure lateral stability of the board 6.

The first 13 and second 14 support elements are located at the front part and the rear part of the board 6 respectively, their longitudinal spacing being such that the board 6 is longitudinally stable.

Each support element 13, 14 has a support part 15, 16 located crosswise under the board 6 and on which the lower face 15 of the board 6 is supported. This support part 15, 16 is rigid and is coated for example with neoprene or gum, that keeps the board 6 supported on these support parts 15, 16 in a fixed position.

The transverse ends 17, 18 of the support elements 13, 14 are composed of an end section 17, 18 that can be seen in FIGS. 2 and 3 that extends from the support part 15, 16 of the corresponding support element 13, 14 as far as an attachment ring 19, 20 flush with the top face 21 of the board 6. It should be noted that each support element 13, 14 comprises two opposite end sections, only one end section being shown in FIGS. 2 and 3 for reasons of clarity.

Furthermore, the end sections 17, 18 make an angle α with the corresponding support part 15, 16 equal to more than 90° so as to match the inclined profile of the edge 23 of the board 6.

As can be seen in FIGS. 2 and 3, the attachment elements 11a, 12a of the secondary lines 9a, 10a are fixed directly onto the attachment ring 19, 20 of the corresponding support element 13, 14.

With reference to FIG. 1, the device according to the invention 1 comprises the first 25 and second 26 lower support lines that each extend longitudinally under the board 6 from a transverse end 17, 18 of a support element 13, 14 as far as the transverse end 17, 18 of the opposite support element 14, 13 located on the same side of the board 6. More precisely and as shown in FIGS. 2 and 3, the ends of each of the first 25 and second 26 lower support lines are fixed to the attachment rings 19, 20 of the end sections 17, 18 of the corresponding support elements 13, 14.

To achieve this, the ends of the first 25 and second 26 lower lines are also composed of a tightening element 25a, 25b; 26a, 26b that is made from a cord, the opposite ends of which comprise a said lark's head knot 25a1, 25b1 (FIGS. 2 and 3), these tightening elements 25a, 25b; 26a, 26b being capable of tensioning the lower support lines 25, 26.

In order to consolidate retention of the board 6 in its suspended position, the device 1 comprises a first 30 and a second 31 retention element that are made from an elastic material and each of which extends across the top face 21 of the board 6 between the end sections 17, 18 of the corresponding support elements 13, 14.

As shown in FIGS. 2 and 3, the opposite ends of the first 30 and second 31 support elements comprise a hook 30a, 31a that is engaged in the attachment rings 19, 20 of the end sections 17, 18 of the support elements 13, 14.

These retaining elements 30, 31 may extend close to the top face 21 of the board 6 but they are preferably in contact with the top face 21 of the board 6 to assure that the suspended board 6 is retained with maximum safety.

Furthermore, if the board 6 is a surf board, an attachment system 32 extends between the opposite end sections 18 of the support element 14 located at the rear part of the board 6, passing through the attachment 33 that forms an integral part of the surf board 6 making the connection between the board 6 and the surfer's foot, to attach the board 6 to the device 1.

To achieve this and as can be seen in FIG. 3, the opposite ends of the attachment system 32 comprise a lark's head type knot 32a fixed into the attachment ring 20 of the opposite end sections 18 of the rear support element 14.

With reference to FIG. 1, the device according to the invention comprises a first 35 and a second 36 tightening strap, each of which extends transversely between the first 9a, 10a and the second 9b, 10b secondary lines of the corresponding main line 2, 3. These tightening straps 35, 36 are installed free to slide relative to the first 9a, 10a and second 9b, 10b secondary lines as shown by arrows F1, F2 so as to vary the intensity of the exercise.

More precisely, when the tightening straps 35, 36 are lowered to be close to the board 6, the distance between the first 9a, 10a and second 9b, 10b secondary lines of the associated main lines 2, 3 becomes smaller. The board 6 then becomes more unstable and the exercise becomes more difficult. On the other hand, when the adjustment bars 35, 36 are raised, the distance between the first 9a, 10a and second 9b, 10b secondary lines of the associated main lines 2, 3 increases. Therefore, the board 6 is more stable and the exercise is easier.

Still with reference to FIG. 1, a safety line 37 extends longitudinally between the single upper parts 7, 8 of the main lines 2, 3. A bar line 38 is suspended vertically above the board 6 extending from the safety line 37 to which said bar line 38 is installed free to slide through a ring 39, as far as a bar 40 that the user will grip to work on the device 1. The bar line 38 comprises two tightening elements 38a, 38b at its ends, the opposite ends of which comprise a lark's head knot and that, as they are tightened, adjust the length of the bar line 38 depending on the height of the user and the exercise being done.

The different tightening elements 11a, 11b, 12a, 12b; 25a, 26a, 25b, 26b; 38a, 38b have already been described. These are the tightening elements 11a, 11b, 12a, 12b located in the lower part of the first 9a, 10a and second 9b, 10b secondary lines, tightening elements 25a, 26a, 25b, 26b located at the ends of the lower support lines 25, 26 located under the board 6, and tightening elements 38a, 38b of the bar line 38.

The device according to the invention 1 also comprises two tightening elements 7a, 8a located in the lower part of the single upper parts 7, 8 of the lines of the main lines 2, 3. These tightening elements 7a, 8a also comprise lark's head type knots at their opposite ends that can be used to shorten or lengthen them, at the same time adjusting the length and the tension of the main lines 2, 3.

The safety line 37 also comprises two tightening elements 37a, 37b located at opposite ends of the so-called safety line 37, adjusting the length of this safety line 37.

When they are taken in isolation, all these tightening elements 7a, 8a; 11a, 11b, 12a, 12b, 25a, 25b, 26a, 26b, 37a, 37b, 38a, 38b can be used to adjust the length and tension of the line on which they are located, and when they are considered together, to adjust the tension of the device according to the invention 1.

The device according to the invention 1 as described above in its first embodiment, can be used for in-line training on a suspended board.

Figure 4:
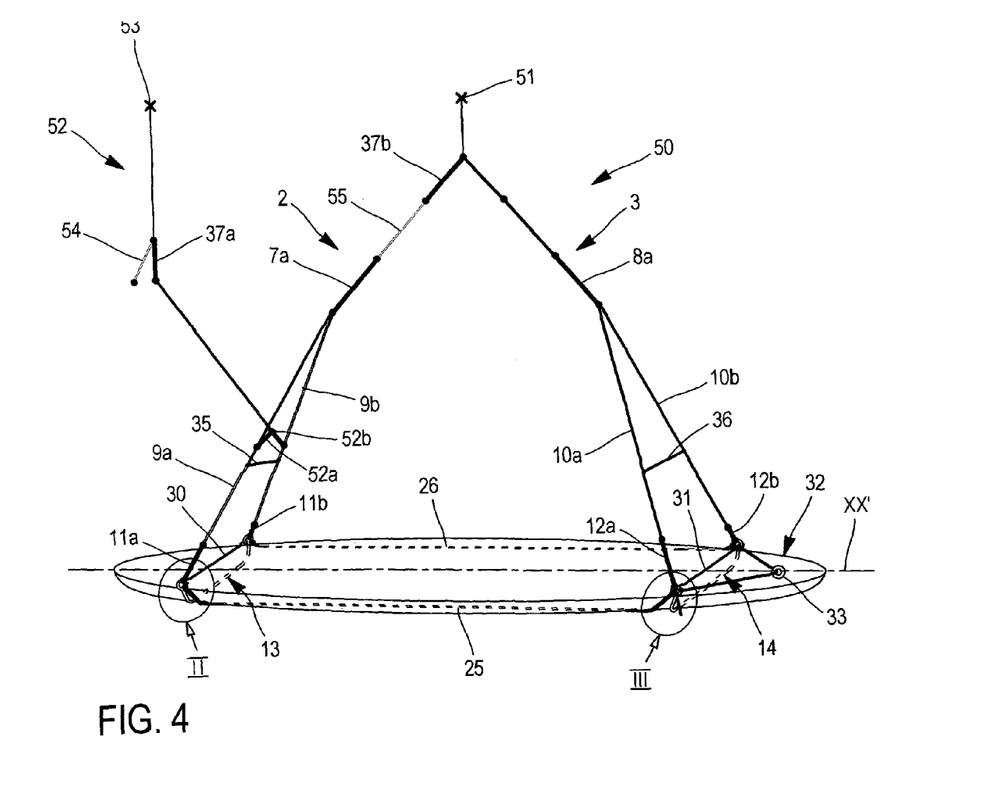
FIG. 4 is a diagrammatic perspective view of a second variant of the device according to the invention.

A second embodiment of the device according to the invention shown in FIG. 4 can be used for rotational training on the board.

The device 50 according to this second variant comprises a certain number of elements in common with the device 1 in the first variant. For reasons of clarity, the common references are reused in the following description.

The device 50 according to the second variant comprises a first main support line 2 and a second main support line 3 that join together in their upper part leading to a single upper attachment point 51.

Apart from this difference at their upper attachment point, the first 2 and second 3 main lines are identical to those described with reference to FIG. 1, namely they are split to form first 9a, 10a and second 9b, 10b secondary lines and their lower part is attached to the board 6. The support bars 13, 14, the lower support lines 25, 26, the elastic retaining elements 30, 31, the attachment element 32 when the board 6 is a surf board and the tightening straps 35, 36 are also common with the device 1 in the first variant. The relative attachments of all these elements are also identical to those described above with reference to FIGS. 1, 2 and 3.

The device 50 according to the second variant comprises a third main line 52 that extends from an upper attachment point 53 located at a longitudinal distance from the attachment point 51 of the first 2 and second 3 main lines on the front side of the board 6, as far as the first 9a and second 9b secondary lines of the first main line 2.

The third main line 52 is attached to the first 9a and second 9b secondary lines of the first main line 2 by two tightening elements 52a, 52b assembled together at their upper end and that can be used to adjust the length of the third main line 52, thus adjusting the rotational movement of the device 50 in the second variant.

The third main line 52 also comprises an additional tightening element 52c arranged in series and that can be used to adjust the tension of this line 52.

The layout of these three main lines 2, 3, 52 is designed so that the user practices his or her balance in rotation.

The device according to the invention 1, 50 comprises means of easily and quickly changing from the in-line device in FIG. 1 to the rotating device in FIG. 4, and vice versa.

To achieve this and with reference to FIG. 1, the device according to the invention 1 comprises a first 54 and a second 55 removable connection.

The first removable connection 54 is located in series on the first main line 2 between the tightening element 7a of this first main line 2 and the junction 56 between the single upper part 7 of the first main line 2 and the safety line 37.

The second removable connection 55 is located in series on the safety line 37 after the tightening element 37b of this safety line 37 located on the same side as the second main line 3.

The first 54 and second 55 removable connections comprise means at their opposite ends for easy detachment and attachment of the line considered, for example a snap hook.

Firstly, the first 54 and second 55 removable connections are used to remove the safety line 37 from the device 1 according to the first variant. The device 1 without the safety line 37 can be used for practicing movements on the board 6 and for muscle relaxation for experts. Such a device 1 can also be used to acquire better understanding of the influence of shoulder movements on the movement of the board 6.

Furthermore, the first 54 and second 55 removable connections can also be used to change from the in-line device as shown in FIG. 1 to the rotating device shown in FIG. 4. This is done by detaching the first removable connection 54 at arrow A shown in FIG. 1 and the second removable connection 55 at arrow B, thus detaching a part of the line that will form the third main line 52 of the second variant of the device. To achieve this, the safety line 37 of the device 1 in FIG. 1 also comprises two additional adjacent tightening elements 52a, 52b installed in series on said safety line 37 after the removable connection 55 of the side opposite the tightening element 37b. These two tightening elements 52a, 52b will be used for the device 50 in the second variant as described previously with reference to FIG. 4.

Once the two removable connections 54, 55 have been detached, the upper attachment point 4 of the first main line 2 of the device in FIG. 1 is offset longitudinally towards the front part of the board 6 to become the attachment point 53 of the third main line 52 of the device in FIG. 4.

The two adjacent tightening elements 52a, 52b of the safety line 37 of the device in FIG. 1 are then fixed to the first 9a and second 9b secondary lines respectively, their corresponding upper ends being fixed together. The result is that the first removable connection element 54 is inactive in that it is suspended by its upper end to the tightening element 37a originally located at the end of the safety line 37 on the side of the first main line 2.

Furthermore at the first 2 and second 3 main lines, the tightening element 7a is fixed to the second removable connection 55, and the upper attachment point 5 of the second main line 3 is centred above the board 6 and thus becomes the single attachment point 51 of the first 2 and second 3 main lines of the second variant of the device as shown in FIG. 4.

Obviously, the change from the rotating device in FIG. 4 to the in-line device in FIG. 1 is made by the reverse operations of the operations that have just been described. The variable nature of the device is such that it can be easily and quickly changed from the in-line configuration (FIG. 1) to the rotating configuration (FIG. 2). Furthermore, the device can be adapted to practice any type of board sport, particularly by the presence of the different tightening elements.

According to another embodiment of the variant not shown and remaining within the scope of the invention, the device may be in the form of the device 50 in FIG. 4 without the third main line 52. Such a device can be used for training for acceleration work by compression and decompression of the legs. Preferably, the third main line 52 is present hanging freely from the upper attachment point 53. The user can then grip it to help in rotation movements.

With reference to FIGS. 5 to 8 and according to a third variant of the invention, the device according to the invention 1 is suspended from a portal frame 60.

Figures 5, 6, 7, 8:
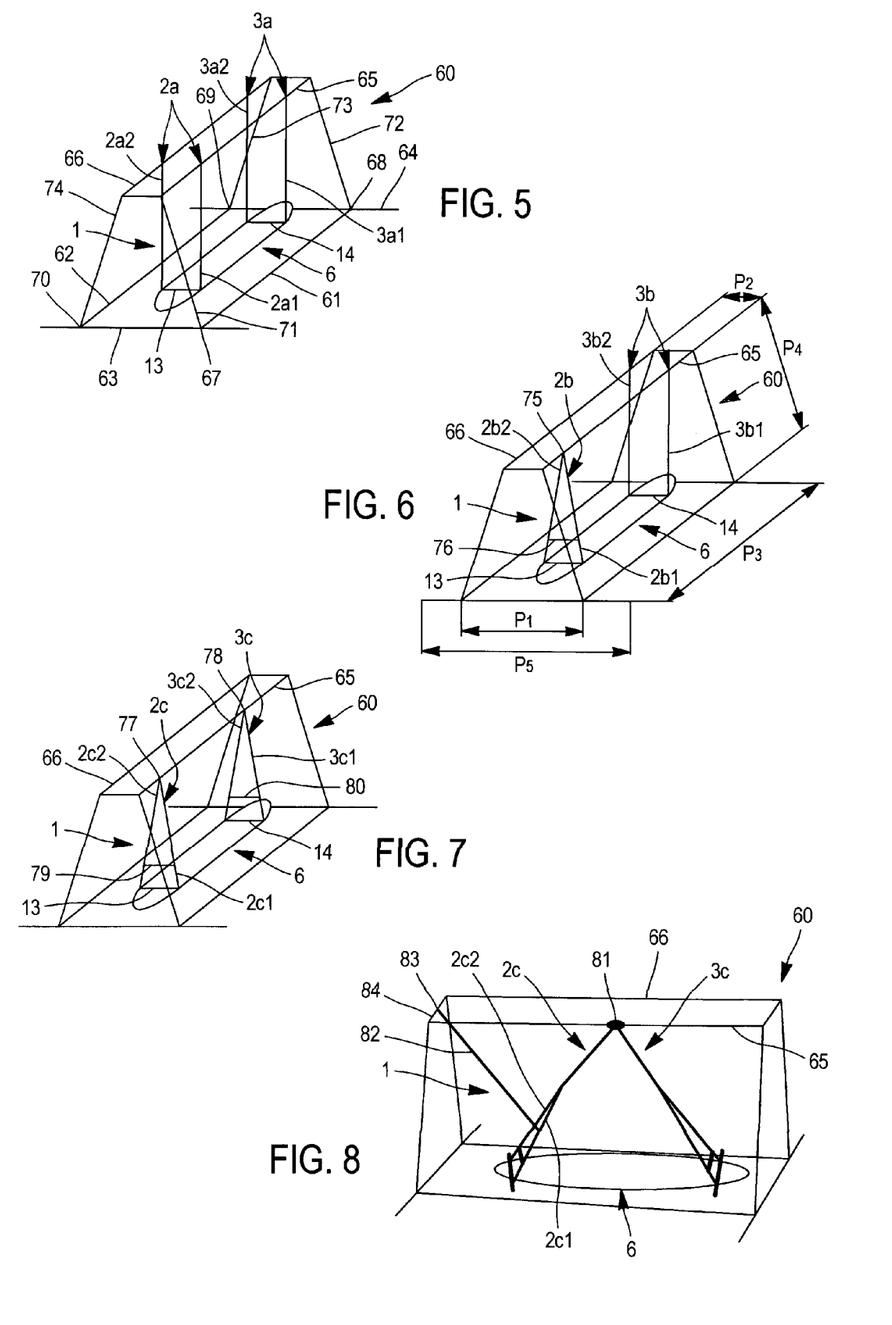
FIG. 5 is a diagrammatic perspective view of a third variant of the device according to the invention in a first configuration.
FIG. 6 is a diagrammatic perspective view of a third variant of the device according to the invention in a second configuration.
FIG. 7 is a diagrammatic perspective view of a third variant of the device according to the invention in a third configuration.
FIG. 8 is a diagrammatic perspective view of a third variant of the device according to the invention in a fourth configuration.

With reference to FIG. 5, this portal frame 60 is composed mainly at its lower part of two lower parallel longitudinal members 61, 62 and two lower parallel transverse members 63, 64 that are supported on the ground. In its upper part, two upper parallel longitudinal members 65, 66 are fixed to the corresponding intersections between the lower parallel longitudinal members 61, 62 and the lower parallel transverse members 63, 64 by means of two oblique pairs of members 71, 72, 73, 74. The oblique orientation of these members 71, 72, 73, 74 is due to the fact that the width P1 between the two lower parallel longitudinal members 61, 62 is more than the width P2 between the two upper parallel longitudinal members 65, 66.

The following gives preferred dimensions of the portal frame 60 with reference to FIG. 6. Although these dimensions are not limitative, they are particularly suitable for suspension of the device according to the invention 1.

The width P1 between the two lower parallel longitudinal members 61, 62 is 160 centimeters, the width P2 between the two upper parallel longitudinal members 65, 66 is 40 centimeters, the length P3 of the two lower parallel longitudinal members 61, 62 is 240 centimeters, the length P4 of each of the oblique members 71, 72, 73, 74 is 240 centimeters and the length P5 of the two lower parallel transverse members 63, 64 is also 240 centimeters.

In this variant, the two upper parallel longitudinal members 65, 66 form an upper attachment of the first 2a, 2b, 2c and second 3a, 3b, 3c main support lines of the board 6. These two upper parallel longitudinal members 65, 66 can be used to make several possible upper attachment configurations depending on the required intensity of the exercise and depending on whether it is preferred to concentrate on in-line or rotational exercises.

More precisely and with reference to FIG. 5, each of the first 2a and second 3a main support lines is composed of two secondary parallel lines 2a1, 2a2, 3a1, 3a2 each extending from the corresponding transverse ends of the first 13 and second 14 support elements.

For each pair of secondary lines 2a1, 2a2, 3a1, 3a2, the upper end of a first secondary line 2a1, 3a1 is fixed to an attachment point on one of the two upper parallel longitudinal members 65 and the upper end of the second secondary line 2a2, 3a2 is fixed to an attachment point on the opposite upper parallel longitudinal member 66.

In this configuration, the intensity of the exercise is fairly low because the distance between the first and second secondary lines 2a1, 2a2 3a1, 3a2 respectively is maximum over the entire height of the suspension.

With reference to FIG. 6, each of the first 2b and second 3b main support lines is composed of two secondary lines 2b1, 2b2, 3b1, 3b2 each of which extends from the transverse ends of the first 13 and second 14 support elements respectively.

For the front main line 2b, the corresponding upper ends of the first secondary line 2b1 and the second secondary line 3b1 are fixed to a common attachment point 75 on an upper longitudinal member 65. The common attachment point 75 could indifferently be located on the opposite upper longitudinal member 66. A tightening strap 76 extends transversally between the first 2b1 and the second 3b1 secondary lines installed free to slide. This tightening strap 76 is identical to that described above with reference to FIG. 1.

For the rear main line 3b, the upper end of the first secondary line 3b1 is fixed to an attachment point on one of the two upper parallel longitudinal members 65 and the upper end of the second secondary line 3b2 is fixed to an attachment point on the opposite upper longitudinal member 66.

Thus in this configuration, the intensity of the exercise can be adjusted at the front part of the board 6 by sliding the tightening strap 76 while the rear part of the board 6 remains stable due to the presence of the first 3b1 and second 3b2 parallel secondary lines.

With reference to FIG. 7, each of the first 2c and second 3c main support lines is composed of two secondary parallel lines 2c1, 2c2, 3c1, 3c2 each of which extends from the corresponding transverse ends of the first 13 and second 14 support elements.

For the front main line 2c, the corresponding upper ends of the first secondary line 2c1 and the second secondary line 3c1 are fixed to a common attachment point 77 on the upper longitudinal member 65. The common attachment point 77 could indifferently be located on the opposite upper longitudinal member 66. A tightening strap 79 extends transversally between the first 2b1 and the second 3b1 secondary lines and is installed free to slide.

Similarly, for the rear main line 3c, the corresponding upper ends of the first secondary line 3c1 and the second secondary line 3c2 are fixed to a common attachment point 78 on the upper longitudinal member 65. The common attachment point 78 could indifferently be located on the opposite upper longitudinal member 66. A tightening strap 80 extends transversally between the first 2b1 and the second 3b1 secondary lines and is installed free to slide.

In this configuration, the intensity of the exercise can be adjusted at the front part of the board 6 and also at its rear part.

For the configurations described with reference to FIGS. 5 to 6, it should be noted that a tightening strap can also be formed between the secondary lines 2a1, 2a2, 3a1, 3a2, 3b1, 3b2 that are fixed to the portal frame 60 by an attachment point specific to each secondary line considered. In this case, the tightening strap will be narrower than the width between two secondary lines considered 2a1, 2a2, 3a1, 3a2, 3b1, 3b2 so as to vary the spacing between these two secondary lines 2a1, 2a2, 3a1, 3a2, 3b1, 3b2, and thus vary the intensity of the exercise at this part of the board.

FIG. 8 shows the adaptation of the configuration of the second variant in FIG. 3 to the installation of the device on the portal frame 60. The references in FIG. 7 are reused because the configuration in FIG. 8 can be obtained from the configuration in FIG. 7.

The two attachment points 77, 78 of the configuration in FIG. 7 are brought together at a single attachment point 81 on one of the two upper longitudinal members 65. The third main line 82 is installed on the device extending from the first 2c1 and second 2c2 secondary lines of the front main line 2c, as far as an attachment point 82 located at an upper transverse member 84 connecting the two upper longitudinal members 65, 66. This third main line 32 is identical to the third main line 52 described with reference to FIG. 4.

Like the configuration shown in FIG. 4, this configuration can be used for rotational training on the board 6.

The portal frame 60 can thus be used to easily vary the intensity and type of training exercise by varying the arrangement of the upper attachments of the main support lines of the board. Although not mentioned in the description of FIGS. 5 to 8, all elements other than the means of suspending the board 6 from the portal frame 60 are present in the third variant of FIGS. 5 to 8, these elements including particularly the retention elements 13, 14, their assembly on the board 6 and their components, the various tightening elements, the lower support lines and the removable connections.

Regardless of which variant is considered, the attachment point(s) of the first 2, 2a, 2b, 2c and second 3, 3a, 3b, 3c main support lines of the board 6 are located above and at a distance from said board 6. This special arrangement of the attachment point(s) makes it possible to more precisely simulate the conditions under which a board is used, particularly a surf board on water. Furthermore, this arrangement of the attachment point(s) also makes it possible to arrange the secondary lines of the first and second main lines, to be able to choose one or two attachment points for each main line depending on the required intensity of the exercise, to be able to arrange a single attachment point with the third main line for rotational practice, and to be able to arrange the tightening straps between two secondary lines to also vary the intensity of the exercise.

All the variants of the device according to the invention thus provide a support for physical and gestural preparation for a board sport. This device can also be used as an apparatus for bodybuilding, balance, and stretching, or as a relaxation support.

The invention claimed is:

1. Training device for a board sport involving the use of a board, the device comprising:
    a first support element of a board and a second support element of the board, each of the first and second support elements extending transversally under the board, and each of the first and second support elements comprising a respective bearing part on which a lower face of the board is supported, and
    at least a first main support line and a second main support line of the board extending from at least one upper attachment point located above and at a distance from the board to the first and second support element respectively, and
    a first holding element of the board and a second holding element of the board made from an elastic material and extending transversely close to a top face of the board between transverse ends of the first and second support elements respectively.

2. Device according to claim 1,
    wherein each of the first and second main lines comprises a first secondary line and a second secondary line, lower ends of the first and second secondary lines of the first main line being fixed to transverse ends of the first support element, and lower ends of the first and second secondary lines of the second main line being fixed to transverse ends of the second support element, and
    wherein the first and second support elements are located at a front part and a rear part of the board respectively.

3. Device according to claim 2, wherein a first lower support line and a second lower support line extend longitudinally under the board from a respective one of the transverse ends of one of the first and second support elements to a respective one of the transverse ends located on a same side of the board of the other of the first and second support elements.

4. Device according to claim 3, wherein a tightening strap extends transversely between the first and the second secondary lines of one of the first and second mainlines, the tightening strap being installed free to slide on the first and second secondary lines.

5. Device according to claim 3, wherein a top end of each of the first and second main lines extends either (i) from two distinct attachment points each coinciding with a top end of one of the respective first and second secondary lines, or (ii) from a single attachment point forming a junction of upper ends of the respective first and second secondary lines.

6. Device according to claim 2, wherein a tightening strap extends transversely between the first and second secondary lines of one of the first and second mainlines, the tightening strap being installed free to slide on the first and second secondary lines.

7. Device according to claim 6, wherein a top end of each of the first and second main lines extends either (i) from two distinct attachment points each coinciding with a top end of one of the respective first and second secondary lines, or (ii) from a single attachment point forming a junction of upper ends of the respective first and second secondary lines.

8. Device according to claim 2, wherein a top end of each of the first and second main lines extends either (i) from two distinct attachment points each coinciding with a top end of one of the respective first and second secondary lines, or (ii) from a single attachment point forming a junction of upper ends of the respective first and second secondary lines.

9. Device according to claim 2,
    wherein the first and second main lines join together in upper parts thereof leading to a single upper attachment point, and
    wherein a third main line extends from an upper attachment point located at a longitudinal distance from the single upper attachment point of the first and second main support lines, to the first and second secondary lines of the closest among the first and second main lines.

10. Device according to claim 2, comprising a first removable attachment installed in series on one of the first and second main lines and a second removable attachment installed close to the other of the first and second main lines in series on a safety line that extends between the first and second main lines while supporting a bar line installed free to slide on the safety line and comprising, at a lower end thereof facing the board, a bar adapted to be gripped by the user of the device, and a third main line,
    wherein the first and second removable attachments are configured so as to allow, when either of the first and second removable attachments is removed, installation of the third main line extending from an upper attachment point to the first and second secondary lines of one of the first and second main lines, a remaining top end of the third main line being fixed to the remaining one of the removable connections.

11. Device according to claim 1, comprising a portal frame including at least two upper parallel longitudinal members connected to lower members supported on the ground, wherein the first and second main lines extend from the upper parallel longitudinal members to the first and second support elements located at a distance above the ground.

12. Device according to claim 11, wherein the upper attachment point(s) of the first and second main lines are located on one or another of the upper parallel longitudinal members.

13. Device according to claim 1, wherein the board is a surf board.

14. Method of preparing physically for a board sport, comprising performing gestures on the device according to claim 1.

15. Training device for a board sport involving the use of a board, the device comprising:
    a first support element of a board and a second support element of the board, each of the first and second support elements extending transversally under the board, and each of the first and second support elements comprising a respective bearing part on which a lower face of the board is supported, and at least a first main support line and a second main support line of the board extending from at least one upper attachment point located above and at a distance from the board to the first and second support element respectively, wherein each of the first and second main lines comprises a first secondary line and a second secondary line, lower ends of the first and second secondary lines of the first main line being fixed to transverse ends of the first support element, and lower ends of the first and second secondary lines of the second main line being fixed to transverse ends of the second support element, wherein the first and second support elements are located at a front part and a rear part of the board respectively, and wherein a tightening strap extends transversely between the first and second secondary lines of one of the first and second mainlines, the tightening strap being installed free to slide on the first and second secondary lines.

16. Device according to claim 15, wherein a first lower support line and a second lower support line extend longitudinally under the board from a respective one of the transverse ends of one of the first and second support elements to a respective one of the transverse ends located on a same side of the board of the other of the first and second support elements.

17. Device according to claim 15, wherein a top end of each of the first and second main lines extends either (i) from two distinct attachment points each coinciding with a top end of one of the respective first and second secondary lines, or (ii) from a single attachment point forming a junction of upper ends of the respective first and second secondary lines.

18. Training device for a board sport involving the use of a board, the device comprising:
a first support element of a board and a second support element of the board, each of the first and second support elements extending transversally under the board, and each of the first and second support elements comprising a respective bearing part on which a lower face of the board is supported, and at least a first main support line and a second main support line of the board extending from at least one upper attachment point located above and at a distance from the board to the first and second support element respectively, wherein each of the first and second main lines comprises a first secondary line and a second secondary line, lower ends of the first and second secondary lines of the first main line being fixed to transverse ends of the first support element, and lower ends of the first and second secondary lines of the second main line being fixed to transverse ends of the second support element, and wherein the first and second support elements are located at a front part and a rear part of the board respectively, wherein the first and second main lines join together in upper parts thereof leading to a single upper attachment point, and wherein a third main line extends from an upper attachment point located at a longitudinal distance from the single upper attachment point of the first and second main support lines, to the first and second secondary lines of the closest among the first and second main lines.

19. Device according to claim 18, wherein a first lower support line and a second lower support line extend longitudinally under the board from a respective one of the transverse ends of one of the first and second support elements to a respective one of the transverse ends located on a same side of the board of the other of the first and second support elements.

20. Device according to claim 18, wherein a top end of each of the first and second main lines extends either (i) from two distinct attachment points each coinciding with a top end of one of the respective first and second secondary lines, or (ii) from a single attachment point forming a junction of upper ends of the respective first and second secondary lines.

* * * * *